UNITED STATES PATENT OFFICE.

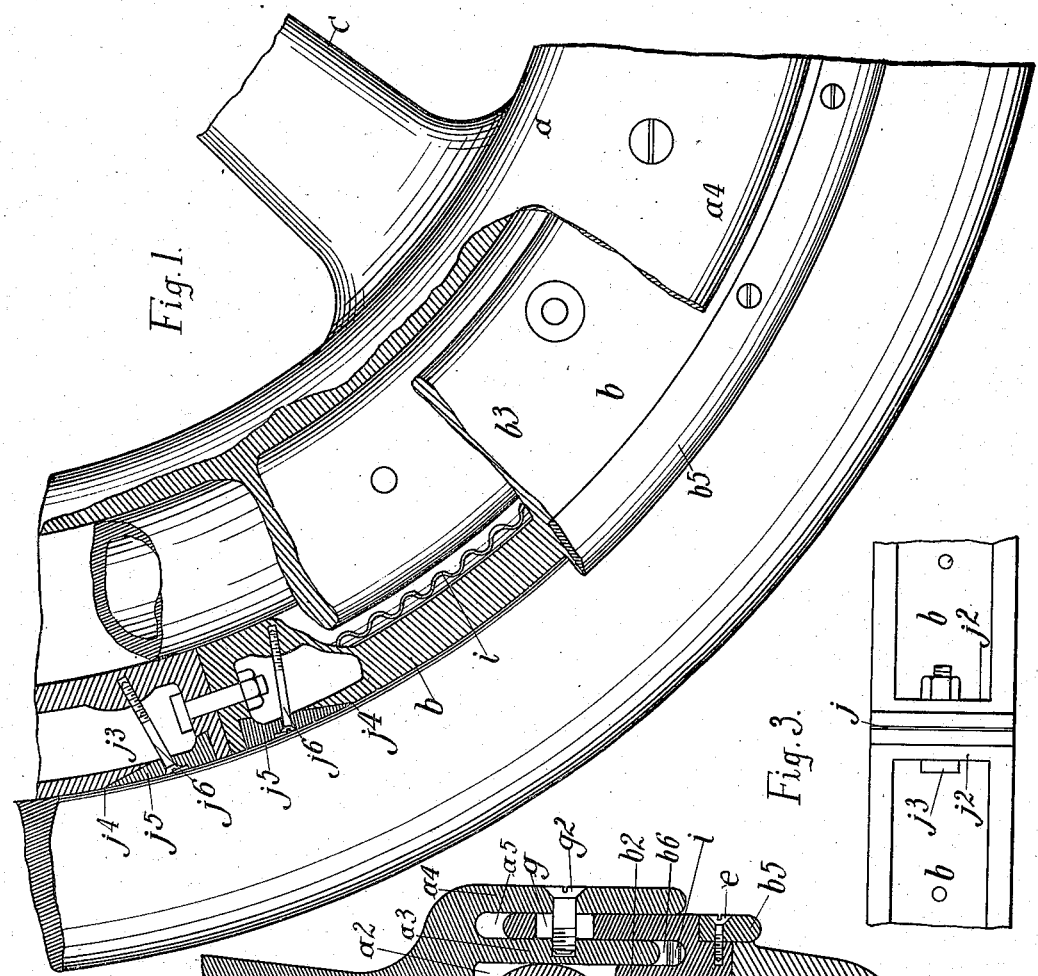

MONTFORD P. MORRISON, OF ATLANTA, GEORGIA.

RIM AND TIRE CONSTRUCTION FOR VEHICLE-WHEELS.

No. 867,588.  Specification of Letters Patent.  Patented Oct. 8, 1907.

Application filed November 5, 1906. Serial No. 341,987.

*To all whom it may concern:*

Be it known that I, MONTFORD P. MORRISON, a citizen of the United States, and residing at Atlanta, in the county of Fulton and State of Georgia, have invented certain new and useful Improvements in Rim and Tire Construction for Vehicle-Wheels, of which the following is a specification, such as will enable those skilled in the art to which it appertains to make and use the same.

This invention relates to the wheels of vehicles and particularly to heavy vehicles of the automobile class, and other heavy vehicles used for pleasure purposes or as passenger vehicles; and the object thereof is to provide an improved rim and tire construction for the wheels of vehicles of this class by which the rim and tire will be given the elastic qualities of a pneumatic or similar tire without danger of puncture or otherwise destroying or injuring the tire.

The invention is fully disclosed in the following specification, of which the accompanying drawing forms a part, in which the separate parts of my improvement are designated by suitable reference characters in each of the views, and in which:—

Figure 1 is a sectional side view of a part of the rim or tire of a wheel made according to my invention; Fig. 2 a transverse section of said rim and tire and on a reduced scale; Fig. 3 a plan or face view of a part of the outer tire which I employ; and, Fig. 4 a sectional side view of said tire member complete and on a much reduced scale.

In the practice of my invention, I provide a wheel having a rim member $a$ and a tire member $b$, and the spokes $c$ are connected with the rim member $a$ in any desired manner. The rim member $a$ is provided in the face thereof with a central annular channel, space or chamber $a^2$ at each side of which is an inner annular flange or rim $a^3$ and an outer annular flange or rim $a^4$ between which are annular spaces $a^5$.

The tire member $b$ is formed of two similar parts as shown in Fig. 4, and consists of a hollow annular body portion $b^2$ which fits between and is movable between the inner annular side flanges $a^3$ of the rim member $a$, and the annular body portion $b^2$ of the tire member is provided with side flanges $b^3$ which fit between the side flanges $a^3$ and $a^4$ of the rim member or in the annular spaces $a^5$ between the flanges $a^3$ and $a^4$ and are movable in said spaces.

The annular body portion $b^2$ of the tire member $b$ is hollow as shown at $b^4$ so as to reduce the amount of metal necessarily employed in the construction of said tire member, and said tire member is provided at the outer side edges thereof with annular beads, ribs or projections $b^5$ between which is placed a solid tread or bearing tire $d$, and one of the said annular beads, ribs or projections $b^5$ of the tire member $b$ is made removable and is held in place by screws, bolts or similar devices $e$. It will also be observed that the annular body portion $b^2$ of the tire member $b$ and the side flanges $b^3$ thereof, form annular spaces $b^6$ in which the inner annular flanges $a^3$ of the rim member fit, and within the annular chamber $a^2$ of the rim member is placed a flexible and elastic pneumatic tube $f$, which is adapted to be inflated in the usual or any desired manner and on which the annular body portion $b^2$ of the tire member $b$ bears.

It will be observed that the transverse dimensions of the side flanges $a^3$ and $a^4$ of the rim member $a$, and the side flanges $b^3$ of the tire member $b$ and the annular chambers in which said flanges fit and move, are of such dimensions transversely, that in the normal position of the rim and tire members or when the vehicle is not loaded, the tire member $b$ rests on the cushion or pneumatic tube $f$, but when the weight is thrown on the wheel or wheels the tire member $b$ is free to move radially and the tube $f$ is compressed and this gives an elastic quality to the tire at all times similar to that of an ordinary pneumatic tire. The solid elastic tread tire $d$ also aids in accomplishing this result and the combination of the tube $f$ and the tread tire $d$ in the manner described provides a wheel or rim and tire construction for a wheel possessing all the qualities of a pneumatic tire and one which will be strong and durable and which cannot be destroyed by puncture or similar accidents.

In practice, in order to prevent the tire member $b$ from turning on the rim member $a$, which might be possible under certain conditions, I provide the flanges $b^3$ of the tire member with holes or openings $g$ and passed through the flanges $a^4$ of the rim member are screws $g^2$ which are also passed through the holes or openings $g$ and into the inner flanges $a^3$ of the rim member. The holes or openings $g$ are considerably larger than the screws or bolts $g^2$ and this permits of a radial movement of the tire member $b$ and at the same time prevents any considerable movement of said tire member around the rim member $a$, or any considerable movement of the rim $a$ in or on the tire member except a radial movement. I also preferably place in the annular chambers $b^6$ of the tire member $b$, and in which the annular flanges $a^3$ of the rim member $a$ fit, convoluted or similar springs $i$ on which the flange members $a^3$ of the rim member $a$ may strike when the vehicle is heavily loaded, and these springs will prevent any sudden jolt or jar by an over-compression at any time of the tube $f$.

In practice, as hereinbefore stated, the tire member $b$ is composed of two parts as shown in Fig. 4, and as also indicated in Fig. 1, and the separate parts of said tire are bolted together as shown at $j$, and in order to do this the hollow chamber or space $b^4$ is provided with end walls $j^2$ through which are passed bolts or screws $j^3$, and in order to accomplish this result the outer wall of the chamber or space $b^4$ is removed as shown at $j^4$, and after the parts of the tire have been bolted together, plates $j^5$ are fitted in the spaces formed at $j^4$ and are secured therein and to the corresponding end portions of the tire member $b$ by means of bolts or screws $j^6$ as clearly shown in Figs. 1 and 4, the bolts or screws $j^6$ being omitted in Fig. 4.

My invention is not limited to the use of a pneumatic tube $f$ in the annular rim member $a$ on which the tire member $b$ may bear and any suitable spring devices may be substituted for said tube.

Having fully described my invention, what I claim as new and desire to secure by Letters Patent, is:—

1. A rim and tire construction for vehicles, comprising a rim member provided in its outer face with a deep annular channel the walls of which are parallel, said rim member being provided at the opposite sides with two projecting parallel annular flanges between which are deep annular grooves the walls of which are parallel, an elastic device placed in said channel, and an annular tire member provided with a central inwardly directed annular portion which fits in and is movable in said channel and which bears on said elastic device and the side walls of which are parallel, said tire member being provided at the opposite sides of said inwardly directed annular portion with deep annular grooves the side walls of which are parallel, said grooves being adapted to receive the inner flanges of the rim member, and said tire member being also provided at its opposite sides with inwardly directed parallel annular flanges adapted to enter the grooves formed by the flanges at the opposite sides of the rim member and the walls of which are parallel, said tire member being free to move in and on said rim member.

2. A rim and tire construction for vehicles, comprising a rim member provided in its outer face with a deep annular channel the walls of which are parallel, said rim member being provided at the opposite sides with two projecting parallel annular flanges between which are deep annular grooves the walls of which are parallel, an elastic device placed in said channel, and an annular tire member provided with a central inwardly directed annular portion which fits in and is movable in said channel and which bears on said elastic device and the side walls of which are parallel, said tire member being provided at the opposite sides of said inwardly directed annular portion with deep annular grooves the side walls of which are parallel, said grooves being adapted to receive the inner flanges of the rim member, and said tire member being also provided at its opposite sides with inwardly directed parallel annular flanges adapted to enter the grooves formed by the flanges at the opposite sides of the rim member and the walls of which are parallel, said tire member being free to move in and on said rim member; and said tire member and said rim member being provided with means for limiting the movement of the tire member on said rim member.

3. A rim and tire construction for vehicles, comprising a rim member provided in its outer face with a deep annular channel the walls of which are parallel, said rim member being provided at the opposite sides with two projecting parallel annular flanges between which are deep annular grooves the walls of which are parallel, an elastic device placed in said channel, and an annular tire member provided with a central inwardly directed annular portion which fits in and is movable in said channel and which bears on said elastic device and the side walls of which are parallel, said tire member being provided at the opposite sides of said inwardly directed annular portion with deep annular grooves the side walls of which are parallel, said grooves being adapted to receive the inner flanges of the rim member and said tire member being also provided at its opposite sides with inwardly directed parallel annular flanges adapted to enter the grooves formed by the flanges at the opposite sides of the rim member and the walls of which are parallel, and said tire member and said rim member being provided with means for limiting the movement of the tire member on said rim member, and said tire member being also provided with an elastic tread tire.

In testimony that I claim the foregoing as my invention I have signed my name in presence of the subscribing witnesses this 3d day of November, 1906.

MONTFORD P. MORRISON.

Witnesses:
C. E. MULREANY,
MAX K. G. GROSSHEIM.